Figure 1:
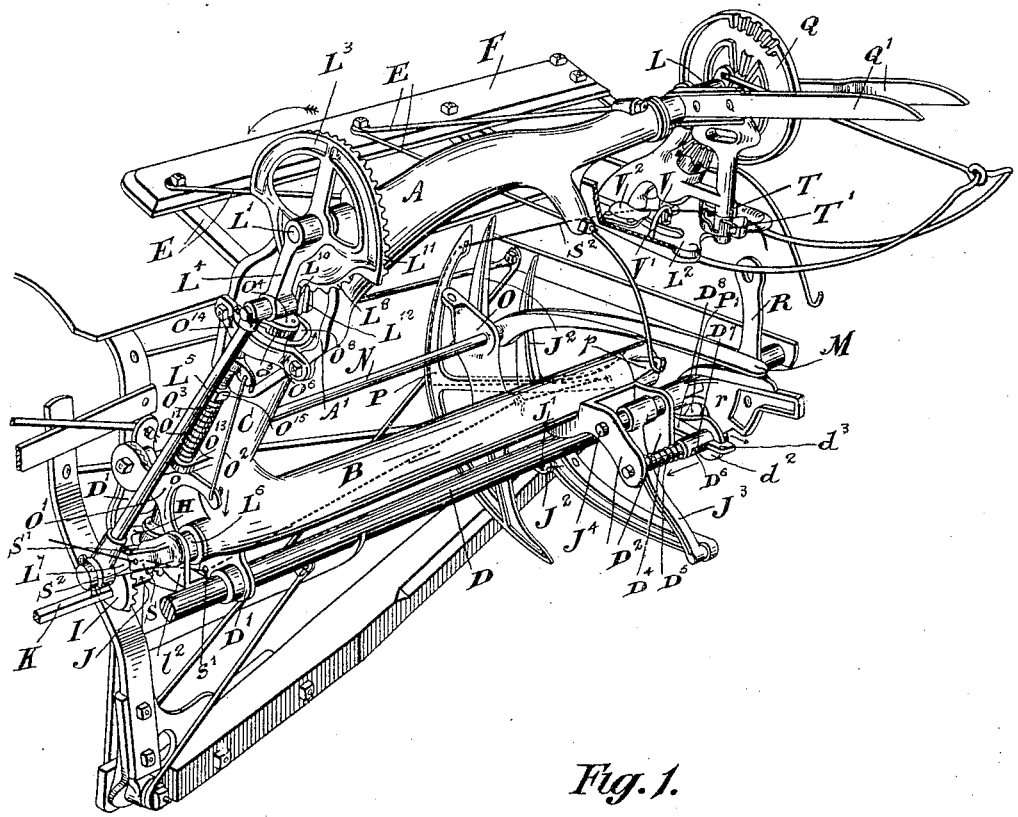

No. 773,546. PATENTED NOV. 1, 1904.
W. J. CLOKEY.
BINDING MECHANISM FOR BINDER MACHINES.
APPLICATION FILED JAN. 13, 1904.
NO MODEL. 7 SHEETS—SHEET 1.

Witnesses.
W. R. Blackhall
Irene B. Ruckle

Inventor.
W. J. Clokey,
by Egerton R. Case,
atty.

No. 773,546. PATENTED NOV. 1, 1904.
W. J. CLOKEY.
BINDING MECHANISM FOR BINDER MACHINES.
APPLICATION FILED JAN. 13, 1904.
NO MODEL. 7 SHEETS—SHEET 2.

No. 773,546. PATENTED NOV. 1, 1904.
W. J. CLOKEY.
BINDING MECHANISM FOR BINDER MACHINES.
APPLICATION FILED JAN. 13, 1904.
NO MODEL. 7 SHEETS—SHEET 3.

Witnesses.

Inventor.

No. 773,546. PATENTED NOV. 1, 1904.
W. J. CLOKEY.
BINDING MECHANISM FOR BINDER MACHINES.
APPLICATION FILED JAN. 13, 1904.
NO MODEL. 7 SHEETS—SHEET 4.

No. 773,546. PATENTED NOV. 1, 1904.
W. J. CLOKEY.
BINDING MECHANISM FOR BINDER MACHINES.
APPLICATION FILED JAN. 13, 1904.
NO MODEL. 7 SHEETS—SHEET 5.
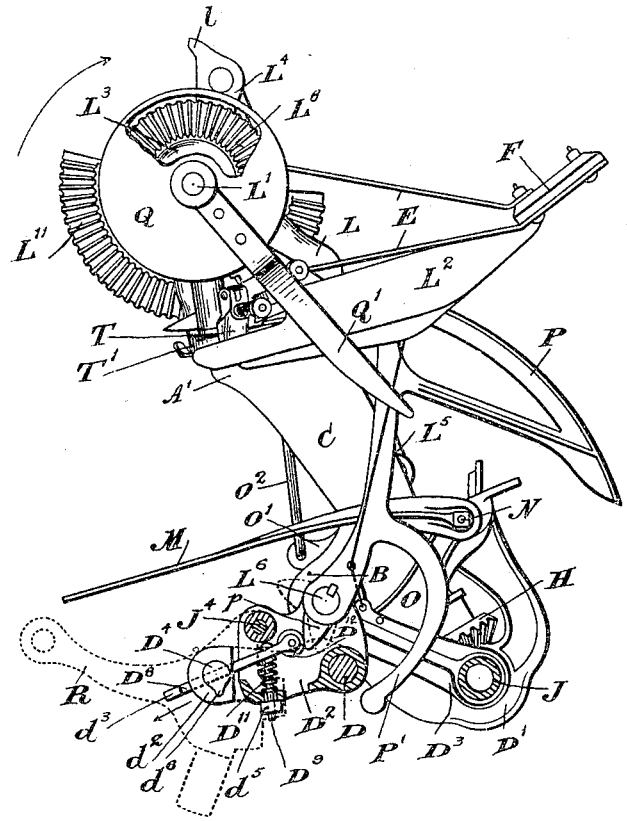
Fig. 5.
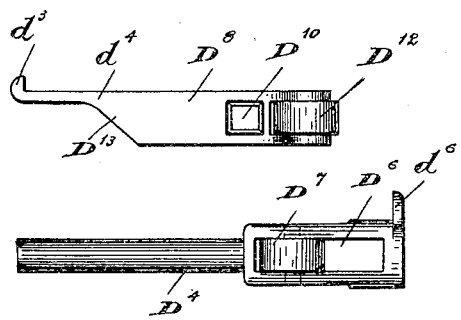
Fig. 9.
Fig. 10.
Witnesses. Inventor:

No. 773,546. PATENTED NOV. 1, 1904.
W. J. CLOKEY.
BINDING MECHANISM FOR BINDER MACHINES.
APPLICATION FILED JAN. 13, 1904.
NO MODEL. 7 SHEETS—SHEET 6.
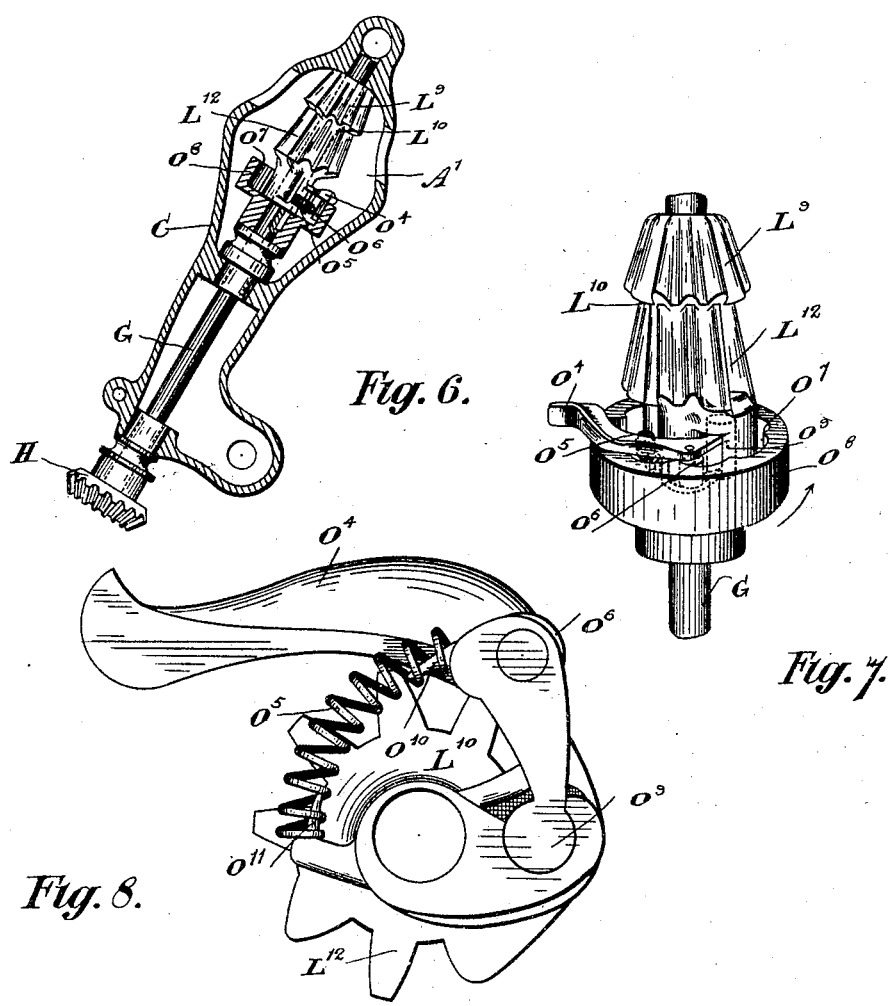
Witnesses.
Inventor.

No. 773,546. PATENTED NOV. 1, 1904.
W. J. CLOKEY.
BINDING MECHANISM FOR BINDER MACHINES.
APPLICATION FILED JAN. 13, 1904.
NO MODEL. 7 SHEETS—SHEET 7.
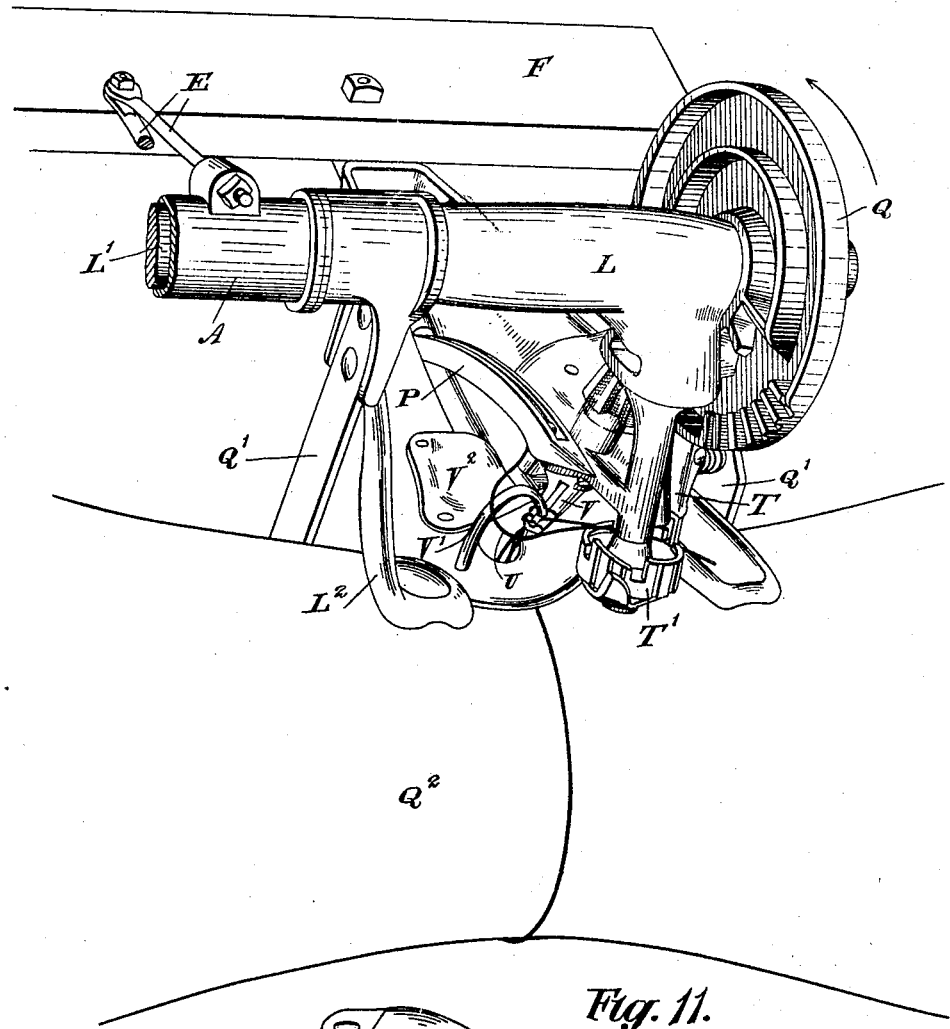
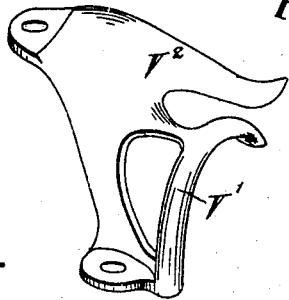
Fig. 11.
Fig. 12.
Witnesses. Inventor.

No. 773,546. Patented November 1, 1904.

UNITED STATES PATENT OFFICE.

WILLIAM JOHN CLOKEY, OF TORONTO, CANADA.

BINDING MECHANISM FOR BINDER-MACHINES.

SPECIFICATION forming part of Letters Patent No. 773,546, dated November 1, 1904.

Application filed January 13, 1904. Serial No. 184,929. (No model.)

*To all whom it may concern:*

Be it known that I, WILLIAM JOHN CLOKEY, inventor, a subject of the King of Great Britain, residing in the city of Toronto, in the county of York, in the Province of Ontario, Canada, have made certain new and useful Improvements in Binding Mechanism for Binder-Machines, of which the following is a specification.

My invention relates to improvements in binding mechanism for binder-machines; and the objects of my invention are, first, to provide particular means to quickly bring into action and quickly return to normal position the needle, knotter mechanism, and discharge-arms and with increased power and a slower movement to enable these parts to successfully perform their function; secondly, to release the compress-finger solely by the operation of the needle and to return same to normal by the needle during its return to normal; thirdly, to positively lock the operating means of the needle, knotter mechanism, and discharge-arms, and, fourthly, to provide loose twine in the needle during its return to normal and to prevent the loose twine from getting under the bill-hook.

My invention consists in the combination of parts shown in the drawings, described in the specification, and set forth in the claims.

Figure 1 is a general perspective view of a binding mechanism embodying my improvements. Figs. 2, 3, 4, and 5 are enlarged end views of the binding mechanism, showing the parts in different positions. Fig. 6 is a longitudinal section through the upright member of the binder-frame, showing support for the double pinion. Fig. 7 is an enlarged perspective view of the double pinion, the starter-ratchet, and preferred means used for locking the double pinion thereto. Fig. 8 is an enlarged under side view of the double pinion and its pawl. Figs. 9 and 10 are enlarged plan views of parts used in connection with the compress-finger. Fig. 11 is an enlarged perspective view of the knotter mechanism, showing an alternative form of twine-guard; and Fig. 12 is a perspective view of the preferred form of twine-guard.

In the drawings like letters of reference indicate corresponding parts in each figure.

I do not confine myself to using any particular binder-frame, knotter mechanism, and packers, nor to any particular way or manner of securing the binder-frame to the machine proper.

A is the upper horizontal member of the binder-frame, B its lower horizontal member, and C is the upright member connecting A and B together.

D is any suitable main support-rod upon which the binder-frame by means of its brackets D' and D² (suitably secured to the member B of the binder-frame) has longitudinal movement.

E represents a series of the usual braces by means of which the member A of the binder-frame is supported to the breast-rail F, which in turn is suitably supported on the machine proper in any well-known manner. Having bearing within the upright member C is the upright shaft G, to the lower end of which is secured a bevel-pinion H, which meshes with the bevel-pinion I, secured to the hollow packer-sleeve J, having bearing in the brackets D' and D³, Fig. 5. At the opposite end of the packer-shaft, by means of the usual crank-arms J', secured thereto, operate the usual packers J², which are connected in the usual manner to the said crank-arms. The said packers are pivoted in the usual manner, one on each side of the usual compress-finger R, by means of the arms J³, to the rod J⁴, held in the bracket D². The drive-shaft K is suitably constructed so as to have movement within the packer-sleeve J and yet drive same. As shown, the drive-shaft is square and fits a correspondingly-shaped center opening of the bevel-wheel I, and thus drives said packer-sleeve.

The binder-frame is of course moved longitudinally, as before mentioned, as is quite common, and the drive-shaft K slides within the packer-sleeve J.

Figure 3:
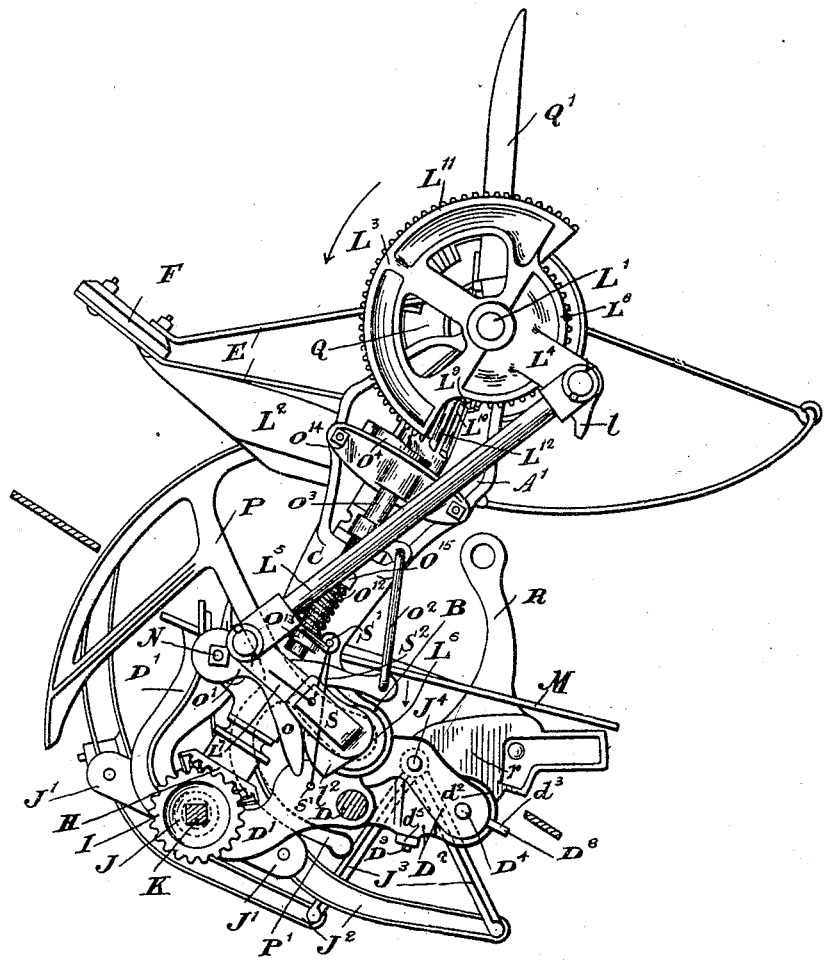
Figure 4:
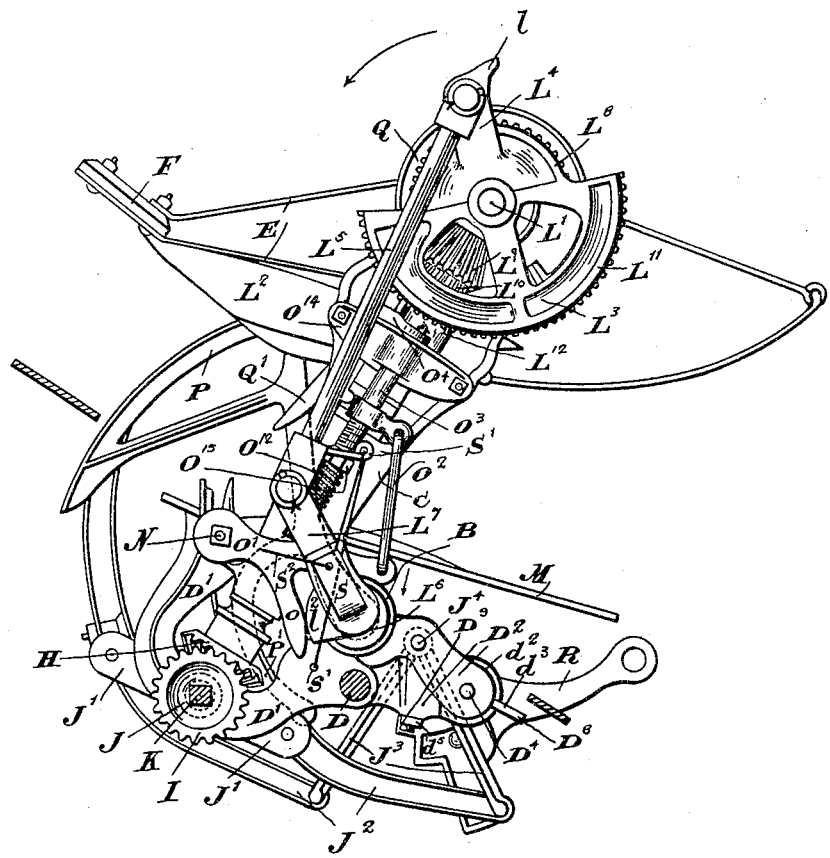

L is the usual knotter-frame held on the knotter-shaft L', which has bearing within the horizontal member A, and L² the usual breast-plate secured in the usual manner to the knotter-frame and to the breast-rail F. Secured on the nearer outer end of the knotter-shaft L' is the toothed knotter-shaft wheel $L^3$, which by means of its arm $L^4$ is connected to the needle-pitman $L^5$, the lower end of which is connected by the needle-crank $L^7$ to the needle-shaft $L^6$, having bearing in the horizontal member B. The toothed knotter-shaft wheel $L^3$ is provided with an inner toothed portion $L^8$, which meshes with the upper pinion $L^9$ of the double pinion $L^{10}$, and an outer toothed portion $L^{11}$, which meshes with the lower pinion $L^{12}$ of said double pinion. As is usual in machines of this class, the packers $J^2$ are always operating. As soon as sufficient straw has been packed in the usual position upon trip-lever M same is depressed and by means of the trip-lever rod N (held in any suitable brackets O and D') depresses the trip-crank O', secured to said rod, in the direction indicated by arrow and by means of the rod $O^2$, connecting said trip-crank to the spring-controlled bolt $O^3$, moves said bolt from the position shown in Fig. 2 out of the path of movement of the starter-pawl $O^4$ of the double pinion $L^{10}$ (see Figs. 3 and 4) and holds it for a time in this position, thus enabling the spring $O^5$ to move the starter-pawl $O^4$, so that its roller $O^6$, suitably journaled therein, will come in contact with the interior ratchet projections $O^7$ of the starter-ratchet $O^8$, and thus lock the double pinion $L^{10}$ to the upright shaft G. As the starter-ratchet $O^8$ is keyed to the upright shaft G and is of course always revolving in the direction shown by arrow, it will be understood that immediately the starter-pawl $O^4$ locks the double pinion to the upright shaft G the pinion $L^9$ operates the toothed portion $L^8$ of the toothed knotter-shaft wheel $L^3$ and moves the needle-pitman $L^5$ and needle-crank $L^7$ and needle P, secured to the needle-shaft $L^6$, into the position shown in Fig. 3, in which position the needle is beginning to pack the straw. From this figure it will be understood that immediately the needle begins to pack the straw the outer toothed portion $L^{11}$ of the knotter-shaft wheel comes into mesh with the pinion $L^{12}$, thus applying its maximum power to the needle during the packing and tying of the sheaf. As the knotter-wheel Q is keyed to the knotter-shaft L', it will be understood that the maximum power of the knotter-shaft wheel will be applied thereto when it is most required—that is, when the sheaf is being compressed and the knot tied. Upon referring to Figs. 4, 5, and 11 the position of the parts is such that the discharge-arms Q' (which are secured to the shaft L') are just commencing to eject the sheaf $Q^2$ from the machine. During this operation it requires, as is well known, considerable power to properly eject the sheaf from the machine and at the same time enable the bill-hook to tie the knot. From Figs. 4 and 5 it will be seen that by means of the toothed portion $L^{11}$, meshing with the lower pinion $L^{12}$, the maximum power of the knotter-shaft wheel is being exerted to discharge the sheaf. It will be understood that the parts move slower when the toothed portion $L^{11}$ of the knotter-shaft wheel $L^3$ is in operation than when the toothed portion $L^8$ of the said wheel is in operation. Immediately the discharge-arms Q' have performed their function the toothed portion $L^8$ of the knotter-shaft wheel comes into mesh with the pinion $L^9$, thus increasing the speed of operation of these parts and returning them to normal position. (Shown in Figs. 1 and 2.) Just before these parts are returned to normal the rod $O^3$ is returned into the path of movement of the starter-pawl $O^4$, so that same will engage therewith, and thus lock the knotter-shaft wheel and its connected parts in normal position. (Shown in Figs. 1 and 2.) In order to hold these parts securely in this position, I secure to the arm $L^4$ or form a part thereof a lug $l$, which abuts against the spring-controlled bolt $O^3$, above the starter-pawl $O^4$, so as to have clearance therewith. During the operation of the parts before described the spring-controlled bolt $O^3$ is of course held out of the path of movement of the starter-pawl $O^4$. Immediately the trip-lever M is operated by the pressure of the straw, as before described, to move the bolt $O^3$ out of the path of movement of starter-pawl $O^4$ the lower end of the lower member $o$ of the trip-crank O' is moved out of contact with the cam $l^2$, secured to or forming part of the needle-crank $L^7$. Immediately the double pinion $L^{10}$ is locked to the upright shaft G it through the means before described operates the needle-crank $L^7$ and moves the cam $l^2$ so as to come into contact with the lower member $o$ and positively hold the bolt $O^3$ out of the path of movement of the starter-pawl $O^4$, as shown in Figs. 3 and 4. As will be seen from the drawings, the upper side of the lower member $o$ is curved outwardly, so that the said cam $l^2$ will engage therewith. The bolt $O^3$ is held in any suitable bearings $O^{13}$ and $O^{14}$, secured to or forming part of the member C, and is provided with any suitable spring $O^{12}$, which rests between the bearing $O^{13}$ and the nut $O^{15}$, threaded on said bolt. The bolt $O^3$ is made long enough so that its upper end will move into the path of movement of the starter-pawl $O^4$ before the trip-crank O' and connected parts are returned to normal. The spring $O^{12}$ keeps the trip-crank O' in contact with the cam $l^2$ except during the period when the trip-lever M depresses said trip-crank and returns said trip-crank and its connected parts to normal during the return to normal of the cam $l^2$ and its connected parts. As will be seen from Figs. 7 and 8, the starter-pawl $O^4$ has bearing in the bottom portion of the double pinion $L^{10}$ by means of its stud $O^9$. This starter-pawl can of course be spring-controlled in any suitable manner and may be pivoted in said double pinion also in any suitable manner. In fact, I do not confine myself to using any particular means for locking the double pinion $L^{10}$ to the upright shaft G. As shown in the drawings, the spring $O^5$ is held on two spurs $O^{10}$ and $O^{11}$, secured to or forming part of, respectively, the starter-pawl $O^4$ and the double pinion.

From the drawings it will be seen that in order to house the starter-ratchet $O^8$ and the double pinion $L^{10}$ and its immediately-connected parts within the upright member C', I provide same with an enlarged upper portion A', as shown.

Figure 2:
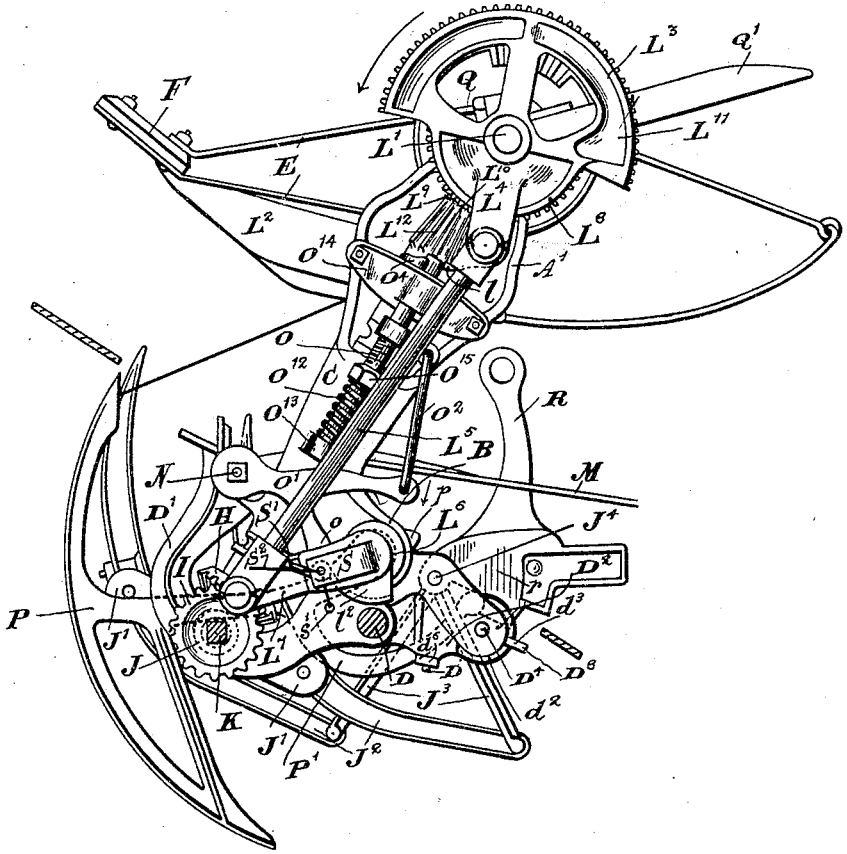

As will be seen on reference to Fig. 2, the normal position of the parts is such that the arm $L^4$ is past the dead-center, thus enabling the parts to be brought quickly into operation. From the description of the operation of the parts shown in Figs. 2, 3, and 4 it will be understood that the needle-crank $L^7$ has an up-and-down movement.

It will of course be understood that the usual compress-finger R, which is journaled on the rod $J^4$, must be moved out of the path of movement of the sheaf before same is ejected from the machine by the action of the discharge-arms Q'. In its normal position the lug $p$, secured to or forming part of the needle P, rests above the means used for releasing the compress-finger R, as shown clearly in Figs. 1 and 2 and in dotted lines in Fig. 5. Supported in the brackets $D^2$ and $d^2$ so as to have axial and longitudinal movement therein is a bolt $D^4$, provided with a spring $D^5$. The head of this bolt is provided with a slot $D^6$, in which operates a roller $D^7$, pivoted in said bolt.

$D^8$ is a plate (see Fig. 9) the lower end $d^4$ of which operates in the slot $D^6$ of the bolt $D^4$. $D^9$ is a pin which passes through the said plate and is secured in the lower part of the bracket $D^2$ by a nut $d^5$ on its lower threaded end. On this pin and between plate $D^8$ and the bracket is held a spring $D^{11}$, which operates to maintain the plate $D^8$ so that its roller $D^{12}$ will be in the path of movement of the lug $p$. The pin $D^9$ has sufficient play in the said parts it is held in in order to enable the plate $D^8$ to be operated. The normal position of the plate $D^8$ is substantially shown in Fig. 5 and is shown in Fig. 1. As the lug $p$ is normally held above the plate $D^8$, it will be understood that when the needle is moved from the position shown in Figs. 1 and 2 into the position shown in Figs. 3 and 5 said lug moves down upon the roller $D^{12}$ and depresses the plate $D^8$, which is brought back to normal position by the spring $D^{11}$ as soon as said lug has escaped said roller by the forward movement of the needle. When the needle has performed its function and shortly after its start to return to normal, its lug $p$ engages with the roller $D^{12}$ and moves the plate $D^8$ in the direction indicated by arrow, thus by means of the beveled portion $D^{13}$ of said plate normally resting against the roller $D^7$ forcing the bolt $D^4$ in the direction indicated by arrow in Fig. 1, thus relieving the support of the compress-finger R and enabling same to fall down into the position shown in Figs. 4 and 5 out of the path of movement of the sheaf. As shown clearly in Figs. 1 and 2, it will be understood that the compress-finger R rests upon the head of the bolt $D^4$, and is thus maintained in its normal position. Immediately the lug $p$ escapes the roller $D^{12}$ the spring $D^5$ forces the bolt $D^4$ against the side $r$ of the compress-finger, and when said compress-finger is returned to normal, as hereinafter described, thus being moved out of the path of movement of the bolt $D^4$, the said spring $D^5$ forces the bolt $D^4$ back to normal, as shown in Fig. 1, during which movement the roller $D^7$ shoots the plate $D^8$ back to normal by means of the beveled portion $D^{13}$. The inward movement of the plate $D^8$ is limited by its lip $d^3$ abutting the side of the bracket $d^2$. In order to prevent the bolt $D^4$ from being moved out of the bracket $d^2$, I provide its head with a lip $d^6$, which abuts against the side of said bracket.

Upon referring to Figs. 1 and 2 it will be noticed that the arm P', secured to or forming part of the needle P, normally abuts the under side of the compress-finger R. When the sheaf has been ejected from the machine, the arm P', during the return to normal of the needle, comes in contact with the compress-finger R and returns same to normal position at the same time the needle is returned to normal.

In order to provide loose twine in the needle during its return to normal, I provide the following preferred means: Secured to or forming part of the needle-crank $L^7$ is an arm S, and secured to or forming part of the needle-pitman $L^5$ is an arm S'. The twine $S^2$ passes from the usual twine-box and is threaded in the arms S and S', as shown, or in any other suitable way and passes through the hole $s'$ in the bracket D' and then in the usual manner, as shown in dotted lines in Fig. 1, same is threaded through the needle and clamped in the usual position between the usual clamp T and the usual cord-holder disk T'. When the needle-pitman $L^5$ is moved from the position shown in Fig. 2 into the positions shown in Figs. 3 and 4, its arm S', which is moved a greater distance than the arm S, pulls a supply of twine, so that during the return to normal of the needle P same is not hindered in any way by tight twine, thus relieving the needle of the function of pulling the twine from the source of supply. By providing the needle with the loose twine, as described, a loop U is formed in said twine where it extends from the eye of the needle. In order to prevent this loop of twine from getting underneath the bill-hook V, I provide a suitable guard V' and secure same to or form it a part thereof of the breastplate $L^2$. The position and shape of the guard V' is such as to make it impossible for the twine to get under the bill-hook. I of course also use the usual twine-finger V².

Upon referring to Fig. 12 it will be noticed that in my preferred form of twine-guard I form it an integral part of the twine-finger V². It will of course be understood that I use the usual knot-tying mechanism. I do not confine myself to using the arms S and S' for threading the twine on the needle-pitman and needle-crank.

I do not confine myself to the construction shown and described of my several improvements, as same may be varied in different ways without departing from the spirit of my invention. The transmission of the minimum to the maximum power, or vice versa, of the operating means for the needle, knotter mechanism, and discharge-arms is accomplished without the slightest jar to the machine. I do not confine myself to any particular means for driving the upright shaft G.

I claim any means in combination with a twine-guard for providing loose twine in the needle, as described.

What I claim as my invention is—

1. In a binding mechanism for binder-machines, the combination with a binder-frame; an upright shaft; a needle-shaft, and a knotter-shaft, all having bearing therein, and needle secured to said needle-shaft, of a double pinion, composed of an upper and a lower pinion, loosely journaled on said upright shaft; means for locking said double pinion to said upright shaft; a knotter-shaft wheel, secured to said knotter-shaft, provided with inner and outer toothed portions, designed to mesh, respectively, with the upper and lower pinions of said double pinion, and connecting means between said knotter-shaft wheel and said needle-shaft.

2. In a binding mechanism for binder-machines, the combination with a binder-frame; an upright shaft; a needle-shaft, and a knotter-shaft, all having bearing therein; and needle secured to said needle-shaft, of a double pinion, composed of an upper and a lower pinion, loosely journaled on said upright shaft; means for locking said double pinion to said upright shaft; a knotter-shaft wheel, secured to said knotter-shaft, provided with inner and outer toothed portions, designed to mesh, respectively, with the upper and lower pinions of said double pinion; a needle-pitman connected to said knotter-shaft wheel, and a needle-crank secured to said needle-shaft and connected to said needle-pitman.

3. In a binding mechanism for binder-machines, the combination with a binder-frame; an upright shaft, and a knotter-shaft, both having bearing therein; a knotter-wheel secured to said knotter-shaft; a knotter-frame; the breastplate, and the knot-tying mechanism, of a double pinion, composed of an upper and a lower pinion, loosely journaled on said upright shaft; means for locking said double pinion to said upright shaft, and a knotter-shaft wheel, secured to said knotter-shaft, provided with inner and outer toothed portions, designed to mesh, respectively, with the upper and lower pinions of said double pinion.

4. In a binding mechanism for binder-machines, the combination with a binder-frame; an upright shaft, and a knotter-shaft, both having bearing therein, and the discharge-arms secured to said knotter-shaft, of a double pinion, composed of an upper and a lower pinion, loosely journaled on said upright shaft; means for locking said double pinion to said upright shaft, and a knotter-shaft wheel, secured to said knotter-shaft, provided with inner and outer toothed portions, designed to mesh, respectively, with the upper and lower pinions of said double pinions.

5. In a binding mechanism for binder-machines, the combination with a binder-frame; an upright shaft, and a knotter-shaft, both having bearing therein; a knotter-wheel secured to said knotter-shaft; the discharge-arms secured also thereto; the knotter-frame; the breastplate, and the knot-tying mechanism; of a double pinion, composed of an upper and a lower pinion, loosely journaled on said upright shaft; means for locking said double pinion to said upright shaft, and a knotter-shaft wheel secured to said knotter-shaft, provided with inner and outer toothed portions, designed to mesh, respectively, with the upper and lower pinions of said double pinion.

6. In a binding mechanism for binder-machines, the combination with a binder-frame; an upright shaft; a needle-shaft; and a knotter-shaft, all having bearing therein; the needle secured to said needle-shaft; the knotter-wheel secured to said knotter-shaft; the breastplate, and the knot-tying mechanism, of a double pinion, composed of an upper and a lower pinion, loosely journaled on said upright shaft; means for locking said double pinion to said upright shaft; a knotter-shaft wheel, secured to said knotter-shaft, provided with inner and outer toothed portions, designed to mesh, respectively, with the upper and lower pinions of said double pinion, and connecting means between said knotter-shaft wheel and said needle-shaft.

7. In a binding mechanism for binder-machines, the combination with a binder-frame; an upright shaft; a needle-shaft, and a knotter-shaft, all having bearing therein; the needle secured to said needle-shaft; the knotter-wheel secured to said knotter-shaft; the breastplate, and the knot-tying mechanism, of a double pinion, composed of an upper and a lower pinion, loosely journaled on said upright shaft; means for locking said double pinion to said upright shaft; a knotter-shaft wheel, secured to said knotter-shaft, provided with inner and outer toothed portions, designed to mesh, respectively, with the upper and lower pinions of said double pinion; the needle-pit-man connected to said knotter-shaft wheel, and the needle-crank secured to said needle-shaft and connected to said needle-pitman.

8. In a binding mechanism for binder-machines, the combination with the binder-frame; an upright shaft; a needle-shaft and a knotter-shaft, all having bearing therein; the needle secured to said needle-shaft; the knotter-wheel secured to said knotter-shaft; the discharge-arms secured to said knotter-shaft; the breastplate, and the knot-tying mechanism, of a double pinion, composed of an upper and a lower pinion, loosely journaled on said upright shaft; means for locking said double pinion to said upright shaft; a knotter-shaft wheel, secured to said knotter-shaft, provided with inner and outer toothed portions, designed to mesh, respectively, with the upper and lower pinions of said double pinion, and connecting means between said knotter-shaft wheel and said needle-shaft.

9. In a binding mechanism for binder-machines, the combination with the binder-frame; an upright shaft; a needle-shaft and a knotter-shaft, all having bearing therein; the needle secured to said needle-shaft; the knotter-wheel secured to said knotter-shaft; the discharge-arms secured to said knotter-shaft; the breastplate, and the knot-tying mechanism; of a double pinion, composed of an upper and a lower pinion, loosely journaled on said upright shaft; means for locking said double pinion to said upright shaft; a knotter-shaft wheel secured to said knotter-shaft, provided with inner and outer toothed portions, designed to mesh, respectively, with the upper and lower pinions of said double pinion; the needle-pitman connected to said knotter-shaft wheel, and the needle-crank secured to said needle-shaft and connected to said needle-pitman.

10. In a binding mechanism for binder-machines, the combination with the binder-frame; an upright shaft; a needle-shaft, and a knotter-shaft, all journaled therein; the needle secured to said needle-shaft; the knotter-wheel secured to said knotter-shaft; the discharge-arms secured to said knotter-shaft; the breastplate, and the knot-tying mechanism, of a double pinion, composed of an upper and a lower pinion, loosely journaled on said upright shaft; a knotter-shaft wheel, secured to said knotter-shaft, provided with inner and outer toothed portions, designed to mesh, respectively, with the upper and lower pinions of said double pinion; a starter-ratchet secured to said upright shaft; a spring-controlled starter-pawl pivoted in said double pinion and designed to lock same to said starter-ratchet; means for controlling the operation of said starter-pawl, and connecting means between said knotter-shaft wheel and said needle-shaft.

11. In a binding mechanism for binder-machines, the combination with the binder-frame; an upright shaft; a needle-shaft, and a knotter-shaft, all journaled therein; the needle secured to said needle-shaft; the knotter-wheel secured to said knotter-shaft; the discharge-arms secured to said knotter-shaft; the breastplate, and the knot-tying mechanism; of a double pinion, composed of an upper and a lower pinion, loosely journaled on said upright shaft; a knotter-shaft wheel, secured to said knotter-shaft, provided with inner and outer toothed portions, designed to mesh, respectively, with the upper and lower pinions of said double pinion; a starter-ratchet secured to said upright shaft; a spring-controlled starter-pawl pivoted in said double pinion and designed to lock same to said starter-ratchet; means for controlling the operation of said starter-pawl; the needle-pitman connected to said knotter-shaft wheel, and the needle-crank secured to said needle-shaft and connected to said needle-pitman.

12. In a binding mechanism for binder-machines, the combination with the binder-frame; an upright shaft; a needle-shaft, and a knotter-shaft, all journaled therein; the needle secured to said needle-shaft; the knotter-wheel secured to said knotter-shaft; the discharge-arms secured to said knotter-shaft; the breastplate, and the knot-tying mechanism; of a double pinion, composed of an upper and a lower pinion, loosely journaled on said upright shaft; a knotter-shaft wheel secured to said knotter-shaft, provided with inner and outer toothed portions, designed to mesh, respectively, with the upper and lower pinions of said double pinion; a starter-ratchet secured to said upright shaft; a spring-controlled starter-pawl pivoted in said double pinion and designed to lock same to said starter-ratchet; a spring-controlled bolt, operating in the path of movement of said starter-pawl; means for operating said spring-controlled bolt to control operation of said starter-pawl, and connecting means between said knotter-shaft wheel and said needle-shaft.

13. In a binding mechanism for binder-machines, the combination with the binder-frame; an upright shaft; a needle-shaft, and a knotter-shaft all journaled therein; the needle secured to said needle-shaft; the knotter-wheel secured to said knotter-shaft; the discharge-arms secured to said knotter-shaft; the breastplate, and the knot-tying mechanism; of a double pinion, composed of an upper and a lower pinion, loosely journaled on said upright shaft; a knotter-shaft wheel secured to said knotter-shaft, provided with inner and outer toothed portions, designed to mesh, respectively, with the upper and lower pinions of said double pinion; a starter-ratchet secured to said upright shaft; a spring-controlled starter-pawl pivoted in said double pinion and designed to lock same to said starter-ratchet; a spring-controlled bolt, operating in the path of movement of said starter-pawl; means for operating said spring-controlled bolt to control operation of said starter-pawl; the needle-pitman connected to said knotter-shaft wheel, and the needle-crank secured to said needle-shaft and connected to said needle-pitman.

14. In a binding mechanism for binder-machines, the combination with the binder-frame; an upright shaft; a needle-shaft, and a knotter-shaft, all having bearing therein; the needle secured to said needle-shaft; the knotter-wheel secured to said knotter-shaft; the discharge-arms secured to said knotter-shaft; the breastplate, and the knot-tying mechanism, of a double pinion, composed of an upper and a lower pinion, loosely journaled on said upright shaft; a knotter-shaft wheel, secured to said knotter-shaft, provided with inner and outer toothed portions designed to mesh, respectively, with the upper and lower pinions of said double pinion; a starter-ratchet secured to said upright shaft; a spring-controlled starter-pawl pivoted in said double pinion and designed to lock same to said starter-ratchet; the trip-lever; a spring-controlled bolt, operating in the path of movement of said starter-pawl; means connecting said trip-lever to said bolt, the depressing of said trip-lever moving said bolt out of the path of movement of said starter-pawl, thus locking said double pinion to said upright shaft, and connecting means between said knotter-shaft wheel and said needle-shaft.

15. In a binding mechanism for binder-machines, the combination with a binder-frame; an upright shaft, a needle-shaft, and a knotter-shaft, all having bearing therein; the needle secured to said needle-shaft; the knotter-wheel secured to said knotter-shaft; the discharge-arms secured to said knotter-shaft; the breastplate, and the knot-tying mechanism, of a double pinion, composed of an upper and a lower pinion, loosely journaled on said upright shaft; the knotter-shaft wheel secured to said knotter-shaft, provided with inner and outer toothed portions, designed to mesh, respectively, with the upper and lower pinions of said double pinion; a starter-ratchet secured to said upright shaft; a spring-controlled starter-pawl, pivoted in said double pinion and designed to lock same to said starter-ratchet; the trip-lever; a spring-controlled bolt operating in the path of movement of said starter-pawl; means connecting said trip-lever to said bolt; the depressing of said trip-lever moving said bolt out of the path of movement of said starter-pawl, thus locking said double pinion to said upright shaft; the needle-pitman connected to said knotter-shaft wheel, and the needle-crank secured to said needle-shaft and connected to said needle-pitman.

16. In a binding mechanism for binder-machines, the combination with a binder-frame; an upright shaft; a needle-shaft, and a knotter-shaft, all having bearing therein; the needle secured to said needle-shaft; the knotter-wheel secured to said knotter-shaft; the discharge-arms secured to said knotter-shaft; the breastplate, and the knot-tying mechanism, of a double pinion, composed of an upper and a lower pinion, loosely journaled on said upright shaft; a knotter-shaft wheel, secured to said knotter-shaft, provided with inner and outer toothed portions designed to mesh, respectively, with the upper and lower pinions of said double pinion; a starter-ratchet secured to said upright shaft; a spring-controlled starter-pawl pivoted in said double pinion and designed to lock same to said starter-ratchet; the trip-lever; a spring-controlled bolt operating in the path of movement of said starter-pawl, means connecting said trip-lever to said bolt, the depressing of said trip-lever moving said bolt out of the path of movement of said starter-pawl, thus locking said double pinion to said upright shaft; means for keeping said bolt out of the path of movement of said starter-pawl until just before the mechanism has completed its cycle, and connecting means between said knotter-shaft wheel and said needle-shaft.

17. In a binding mechanism for binder-machines, the combination with a binder-frame; an upright shaft; a needle-shaft, and a knotter-shaft, all having bearing therein; the needle secured to said needle-shaft; the knotter-wheel secured to said knotter-shaft; the discharge-arms secured to said knotter-shaft; the breastplate, and the knot-tying mechanism, of a double pinion, composed of an upper and a lower pinion, loosely journaled on said upright shaft; a knotter-shaft wheel, secured to said knotter-shaft provided with inner and outer toothed portions, designed to mesh, respectively, with the upper and lower pinions of said double pinion; a starter-ratchet secured to said upright shaft; a spring-controlled starter-pawl, pivoted in said double pinion and designed to lock same to said starter-ratchet; the trip-lever; a spring-controlled bolt operating in the path of movement of said starter-pawl; means connecting said trip-lever to said bolt; the depressing of said trip-lever moving said bolt out of the path of movement of said starter-pawl thus locking said double pinion to said upright shaft; means for keeping said bolt out of the path of movement of said starter-pawl until just before the mechanism has completed its cycle; the needle-pitman connected to said knotter-shaft wheel, and the needle-crank secured to said needle-shaft and connected to said needle pitman.

18. In a binding mechanism for binder-machines, the combination with a binder-frame; an upright shaft; a needle-shaft, and a knotter-shaft, all having bearing therein; the needle secured to said needle-shaft; the knotter-wheel secured to said knotter-shaft; the discharge-arms secured to said knotter-shaft; the breastplate, and the knot-tying mechanism, of a double pinion, composed of an upper and a lower pinion, loosely journaled on said upright shaft; a knotter-shaft wheel secured to said knotter-shaft, provided with inner and outer toothed portions, designed to mesh, respectively, with the upper and lower pinions of said double pinion; a starter-ratchet secured to said upright shaft; a spring-controlled starter-pawl pivoted in said double pinion and designed to lock same to said starter-ratchet; the trip-lever; the trip-lever rod; bearings for same; the trip-crank secured to said trip-lever rod; a spring-controlled bolt operating in the path of movement of said starter-pawl, connected to said trip-crank, the depressing of said trip-lever moving said spring-controlled bolt out of the path of movement of said starter-pawl for said double pinion, thus locking same to said upright shaft; means operating against said trip-crank in order to keep said spring-controlled bolt out of the path of movement of said starter-pawl until just before the mechanism has completed its cycle, and connecting means between said knotter-shaft wheel and said needle-shaft.

19. In a binding mechanism for binder-machines, the combination with a binder-frame; an upright shaft; a needle-shaft, and a knotter-shaft, all having bearing therein; the needle secured to said needle-shaft; the knotter-wheel secured to said knotter-shaft; the discharge-arms secured to said knotter-shaft; the breast-plate, and the knot-tying mechanism, of a double pinion, composed of an upper and a lower pinion, loosely journaled on said upright shaft; a knotter-shaft wheel, secured to said knotter-shaft, provided with inner and outer toothed portions designed to mesh, respectively, with the upper and lower pinions of said double pinion; a starter-ratchet secured to said upright shaft; a spring-controlled starter-pawl pivoted in said double pinion and designed to lock same to said starter-ratchet; the trip-lever; the trip-lever rod; bearings for same; the trip-crank secured to said trip-lever rod; a spring-controlled bolt operating in the path of movement of said starter-pawl, connected to said trip-crank, the depressing of said trip-lever moving said spring-controlled bolt out of the path of movement of said starter-pawl for said double pinion, thus locking same to said upright shaft; means operating against said trip-crank in order to keep said spring-controlled bolt out of the path of movement of said starter-pawl until just before the mechanism has completed its cycle; the needle-pitman connected to said knotter-shaft wheel, and the needle-crank secured to said needle-shaft and connected to said needle-pitman.

20. In a binding mechanism for binder-machines, the combination with the binder-frame; an upright shaft; a needle-shaft, and a knotter-shaft, all having bearing therein; the needle secured to said needle-shaft; the knotter-wheel secured to said knotter-shaft; the discharge-arms secured to said knotter-shaft; the breast-plate, and the knot-tying mechanism, of a double pinion, composed of an upper and a lower pinion, loosely journaled on said upright shaft; a knotter-shaft wheel, secured to said knotter-shaft, provided with inner and outer toothed portions designed to mesh, respectively, with the upper and lower pinions of said double pinion; a starter-ratchet secured to said upright shaft; a spring-controlled starter-pawl pivoted in said double pinion and designed to lock same to said starter-ratchet; the trip-lever; the trip-lever rod; bearings for same; the trip-crank secured to said trip-lever rod; a spring-controlled bolt operating in the path of movement of said starter-pawl, connected to said trip-crank, the depressing of said trip-lever moving said spring-controlled bolt out of the path of movement of said starter-pawl for said double pinion, thus locking same to said upright shaft; the needle-pitman secured to said knotter-shaft wheel; the needle-crank connecting said needle-shaft to said needle-pitman, and a cam, designed to operate against said trip-crank in order to keep said spring-controlled bolt out of the path of movement of said starter-pawl until just before the mechanism has completed its cycle.

21. In a binding mechanism for binder-machines, the combination with a binder-frame; an upright shaft having bearing therein, and the trip-lever, of a double pinion, composed of an upper and a lower pinion, loosely journaled on said upright shaft; means for locking said double pinion thereto; a bolt designed to control operation of said locking means for said double pinion, the depressing of said trip-lever moving said bolt out of the path of movement of said locking means, and means connecting said trip-lever to said bolt.

22. In a binding mechanism for binder-machines, the combination with the binder-frame; an upright shaft having bearing therein, and the trip-lever, of a double pinion, composed of an upper and a lower pinion, loosely journaled on said upright shaft; a starter-ratchet secured to said upright shaft; a spring-controlled starter-pawl pivoted in said double pinion, designed to lock same to said starter-ratchet; a bolt designed to control operation of said starter-pawl, the depressing of said trip-lever moving said bolt out of the path of movement of said starter-pawl, and means connecting said trip-lever to said bolt.

23. In a binding mechanism for binder-machines, the combination with a binder-frame; an upright shaft having bearing therein, and the trip-lever, of a double pinion, composed of an upper and a lower pinion, loosely journaled on said upright shaft; a starter-ratchet, secured to said upright shaft; a spring-controlled starter-pawl, pivoted in said double pinion, designed to lock same to said starter-ratchet; a spring-controlled bolt operating in the path of movement of said starter-pawl, and means connecting said trip-lever to said bolt, the depressing of said trip-lever moving said bolt out of the path of movement of said starter-pawl, thus locking said double pinion to said upright shaft.

24. In a binding mechanism for binder-machines, the combination with a binder-frame; an upright shaft, and a knotter-shaft, both having bearing therein, and the trip-lever, of a double pinion, composed of an upper and a lower pinion, loosely journaled on said upright shaft; means for locking said double pinion to said upright shaft; the knotter-shaft wheel secured to said knotter-shaft, provided with inner and outer toothed portions designed to mesh, respectively, with the upper and lower pinions of said double pinion; means operated to control movement of said means for locking said double pinion to said upright shaft, and means connecting said trip-lever to said means for controlling movement of said locking means for said double pinion, the depressing of said trip-lever moving said means for controlling movement of said locking means for said double pinion out of the path of movement of said locking means for said double pinion.

25. In a binding mechanism for binder-machines, the combination with a binder-frame; an upright shaft, and a knotter-shaft, both having bearing therein, and the trip-lever, of a double pinion, composed of an upper and a lower pinion, loosely journaled on said upright shaft; means for locking said double pinion to said upright shaft; a knotter-shaft wheel secured to said knotter-shaft, provided with inner and outer toothed portions, designed to mesh, respectively, with the upper and lower pinions of said double pinion; a spring-controlled bolt operating in the path of movement of said means for locking said double pinion to said upright shaft, and means connecting said trip-lever to said bolt, the depressing of said trip-lever moving said bolt out of the path of movement of said locking means for said double pinion.

26. In a binding mechanism for binder-machines, the combination with a binder-frame; an upright shaft, and a knotter-shaft, both having bearing therein; and the trip-lever, of a double pinion, loosely journaled on said upright shaft, composed of an upper and a lower pinion; a knotter-shaft wheel, secured to said knotter-shaft, provided with inner and outer toothed portions, designed to mesh, respectively, with the upper and lower pinions of said double pinion; means for locking said double pinion to said upright shaft; a spring-controlled bolt operating in the path of movement of said locking means for said double pinion; means connecting said trip-lever to said spring-controlled bolt, the depressing of said trip-lever operating said bolt so that said locking means for said double pinion will lock same to said upright shaft, and means connected to said bolt for holding same out of the path of movement of said locking means during complete cycle of said knotter-shaft wheel.

27. In a binding mechanism for binder-machines, the combination with the binder-frame; an upright shaft; a knotter-shaft, and a needle-shaft, all having bearing therein; the needle-crank secured to said needle-shaft; the needle-pitman connected to said needle-crank and to the knotter-shaft wheel, and the trip-lever, of a double pinion, loosely journaled on said upright shaft, composed of an upper and a lower pinion; a knotter-shaft wheel secured to said knotter-shaft, provided with inner and outer toothed portions, designed to mesh, respectively, with the upper and lower pinions of said double pinion; means for locking said double pinion to said upright shaft; a spring-controlled bolt operating in the path of movement of said locking means for said double pinion; means connecting said trip-lever to said spring-controlled bolt, the depressing of said trip-lever operating said bolt so that said locking means for said double pinion will lock same to said upright shaft; the trip-crank connected to said trip-lever and to said bolt, and a cam secured to said needle-crank and operating against said trip-crank to hold said bolt out of the path of movement of said locking means during complete cycle of said knotter-shaft wheel.

28. In a binding mechanism for binder-machines, the combination with the binder-frame; an upright shaft; a knotter-shaft, and a needle-shaft, all having bearing therein; the needle-crank secured to said needle-shaft; the needle-pitman connected to said needle-crank and to the knotter-shaft wheel, and the trip-lever, of a double pinion, composed of an upper and a lower pinion, loosely journaled on said upright shaft; a knotter-shaft wheel secured to said knotter-shaft, provided with inner and outer toothed portions, designed to mesh, respectively, with the upper and lower pinions of said double pinion; a starter-ratchet, secured to said upright shaft; a spring-controlled starter-pawl, pivoted in said double pinion, designed to lock same to said starter-ratchet; a spring-controlled bolt operating in the path of movement of said starter-pawl; means connecting said trip-lever to said spring-controlled bolt, the depressing of said trip-lever operating said bolt so that said starter-pawl will lock said double pinion to said upright shaft; and a cam, secured to said needle-crank and operating against said means connecting said trip-lever to said spring-controlled bolt to hold said bolt out of the path of movement of said starter-pawl during complete cycle of said knotter-shaft wheel.

29. In a binding mechanism for binder-machines, the combination with a binder-frame;

an upright shaft, and a knotter-shaft, both having bearing therein, of a double pinion, composed of an upper and a lower pinion, loosely journaled on said upright shaft, means for locking said double pinion to said upright shaft; a bolt operating in the path of movement of said locking means for said double pinion to control operation of same; a knotter-shaft wheel secured to said knotter-shaft, provided with inner and outer toothed portions, designed to mesh, respectively, with the said upper and lower pinions, and an arm secured to said knotter-shaft wheel and designed to abut against said bolt when said locking means for said double pinion abuts thereagainst, thus locking said knotter-shaft wheel and said double pinion firmly at normal.

30. In a binding mechanism for binder-machines, the combination with the binder-frame; an upright shaft; a needle-shaft, and the knotter-shaft, all having bearing therein; the needle secured to said needle-shaft; a knotter-wheel secured to said knotter-shaft; the discharge-arms, secured to said knotter-shaft; the breastplate; the knot-tying mechanism; the needle-pitman connected to said knotter-shaft wheel, and the needle-crank secured to said needle-shaft and connected to said needle-pitman, of a double pinion, composed of an upper and a lower pinion, loosely journaled on said upright shaft; means for locking said double pinion to said upright shaft; a knotter-shaft wheel, secured to said knotter-shaft, provided with inner and outer toothed portions, designed to mesh, respectively, with the upper and lower pinions of said double pinion; an arm attached to said needle-pitman; another arm attached to said needle-crank, the twine being threaded through said arms and needle and clamped in place by said knot-tying mechanism, and a twine-guard placed on said breastplate to prevent said twine from becoming entangled in said knot-tying mechanism during the return to normal of said needle.

31. In a binding mechanism for binder-machines, the combination with the binder-frame; an upright shaft; a needle-shaft; and the knotter-shaft, all having bearing therein; a knotter-shaft wheel keyed to said knotter-shaft; means, operated by said upright shaft, for driving said knotter-shaft wheel; means for locking said driving means to said upright shaft; the needle-pitman connected to said knotter-shaft wheel; the needle-crank connecting said needle-pitman to the needle-shaft; a trip-lever; of a trip-crank connected to said trip-lever; a spring-controlled bolt connected to said trip-crank and designed to normally rest in the path of movement of the locking means for the operating means operated by said upright shaft, and a cam secured to said needle-crank and designed to operate against said trip-crank to positively hold said spring-controlled bolt down out of the path of movement of said locking means for the operating means operated by said upright shaft.

32. In a binding mechanism for binder-machines, the combination with the binder-frame; the upright shaft having bearing therein, and the starter-ratchet keyed to said upright shaft, of a double pinion loosely journaled on said upright shaft, and a spring-controlled starter-pawl pivoted in said double pinion and designed to engage with the ratchet projections of said starter-ratchet and lock said double pinion to said upright shaft.

33. In a binding mechanism for binder-machines, the combination with the binder-frame; the upright shaft having bearing therein; a double pinion composed of an upper and a lower pinion, loosely journaled thereon, and means for locking said double pinion to said upright shaft, of the knotter-shaft having bearing in said binder-frame, and a knotter-shaft wheel secured thereto, provided with inner and outer toothed portions designed to mesh, respectively, with said upper and lower pinions.

34. In a binding mechanism for binder-machines, the combination with a binder-frame; an upright shaft, and knotter-shaft, both having bearing therein, of a double pinion, composed of an upper and a lower pinion, loosely journaled on said upright shaft; a starter-ratchet, secured to said upright shaft, the spring-controlled starter-pawl pivoted in said double pinion and designed to lock same to said starter-ratchet; a bolt operating in the path of movement of said starter-pawl to control operation of same; a knotter-shaft wheel secured to said knotter-shaft provided with inner and outer toothed portions, designed to mesh, respectively, with said upper and lower pinions, and an arm secured to said knotter-shaft wheel and designed to abut against said bolt when said starter-pawl abuts thereagainst, thus locking said knotter-shaft wheel and said double pinion firmly at normal.

35. In a binding mechanism for binder-machines, the combination with a binder-frame; an upright shaft and a knotter-shaft, both having bearing therein, of a knotter-shaft wheel secured to said knotter-shaft; means operated by said upright shaft to drive said knotter-shaft wheel; means for locking said driving means for said knotter-shaft wheel to said upright shaft; a bolt operating in the path of movement of said locking means, and an arm secured to said knotter-shaft wheel and designed to abut against said bolt when said locking means for said driving means abuts thereagainst, thus locking said knotter-shaft wheel and said driving means firmly at normal.

36. In a binding mechanism for binder-machines, the combination with a needle; a lug on same; a shaft for said needle, and the compress-finger, of a slot-provided horizontally-held spring-controlled bolt providing a rigid support for said compress-finger; a bracket in which said bolt has both longitudinal and axial movement; a roller pivoted in said bolt and operating in said slot; a spring-controlled plate operating in the slot in said bolt and provided with a beveled portion which operates against said roller, the said lug, during the return to normal position of said needle, moving said spring-controlled plate outward so that its beveled portion will abut against said roller and move said spring-controlled bolt out of the path of movement of said compress-finger and thus release same.

37. In a binding mechanism for binder-machines, the combination with a needle; a lug on same; a shaft for said needle, and the compress-finger, of a slot-provided horizontally-held spring-controlled bolt providing a rigid support for said compress-finger; a bracket in which said bolt has both longitudinal and axial movement; a roller pivoted in said bolt and operating in said slot; a plate operating in the slot in said bolt and provided with a beveled portion which operates against said roller; a bracket; a pin or bolt held in said bracket and in said plate so as to permit of the in-and-out movement of said plate, and a spring on said pin or bolt between said bracket and said plate by means of which said plate is kept in the path of movement of said lug, the said lug during the return to normal position of said needle, moving said spring-controlled plate outward so that its beveled portion will abut against said roller and move said spring-controlled bolt out of the path of movement of said compress-finger and thus release same.

38. In a binding mechanism for binder-machines, the combination with a needle; a lug on same; a shaft for said needle, and the compress-finger, of a slot-provided horizontally-held spring-controlled bolt providing a rigid support for said compress-finger; a bracket in which said bolt has both longitudinal and axial movement; a roller pivoted in said bolt and operating in said slot; a plate operating in the slot in said bolt and provided with a beveled portion which operates against said roller; a bracket; a pin or bolt held in said bracket and in said plate so as to permit of the in-and-out movement of said plate; a spring on said pin or bolt between said bracket and said plate by means of which said plate is kept in the path of movement of said lug, the said lug during the return to normal position of said needle, moving said spring-controlled plate outward so that its beveled portion will abut against said roller and move said spring-controlled bolt out of the path of movement of said compress-finger and thus release same, and a lip or stop for said plate and designed to abut against said bracket so as to limit inward movement of said plate.

39. In a binding mechanism for binder-machines, the combination with a needle; a lug on same; a shaft for said needle; and the compress-finger, of a slot-provided horizontally-held spring-controlled bolt providing a rigid support for said compress-finger; a bracket in which said bolt has both longitudinal and axial movement; a roller pivoted in said bolt and operating in said slot; a spring-controlled plate operating in the slot in said bolt and provided with a beveled portion which operates against said roller, the said lug, during the return to normal position of said needle, moving said spring-controlled plate outward so that its beveled portion will abut against said roller and move said spring-controlled bolt out of the path of movement of said compress-finger and thus release same, and a rigid arm on said needle designed to abut against said compress-finger and return it to normal position.

40. In a binding mechanism for binder-machines, the combination with the compress-finger, and support on which same swings, of a slot-provided horizontally-held spring-controlled bolt; a bracket in which said bolt has both longitudinal and axial movement; a roller pivoted in said bolt and operating in said slot, the said bolt at normal position providing a rigid support so as to maintain said compress-finger at normal; a plate operating in said slot in said bolt, and provided with a beveled portion which operates against said roller, and means for operating said plate so as to operate said bolt to release said compress-finger.

41. In a binding mechanism for binder-machines, the combination with a binder-frame; the needle-crank; the needle-shaft to which same is secured; the needle-pitman attached to said needle-crank, and operating means for said needle-crank and said needle-pitman, of an arm secured to said needle-pitman and provided with a hole, and another arm secured to said needle-crank, also provided with a hole, as and for the purpose specified.

42. In a binding mechanism for binder-machines, the combination with the binder-frame; the needle-shaft, and the knotter-shaft, both having bearing therein; the needle secured to said needle-shaft; the knotter-wheel secured to said knotter-shaft; the breastplate; the twine clamping and cutting mechanism; the bill-hook; the needle-pitman, provided with a hole; means secured to said knotter-shaft and connected to said needle-pitman to operate same, and the needle-crank, also provided with a hole, secured to said needle-shaft and attached to said needle-pitman, of a twine-guard on said breastplate, as and for the purpose specified.

43. In a binding mechanism for binder-machines, the combination with the binder-frame; the needle-shaft, and the knotter-shaft, both having bearing therein; the needle secured to said needle-shaft; the knotter-wheel secured to said knotter-shaft; the breastplate; the twine clamping and cutting mechanism; the bill-hook; the needle-pitman; an arm secured thereto and provided with a hole; means secured to said knotter-shaft and connected to said needle-pitman to operate same; the needle-crank secured to said needle-shaft and attached to said needle-pitman, and an arm, provided with a hole, secured to said needle-crank, of a twine-guard on said breastplate, as and for the purpose specified.

In testimony whereof I have signed my name to this specification in the presence of two subscribing witnesses.

WILLIAM JOHN CLOKEY.

Witnesses:
EGERTON R. CASE,
W. R. BLACKHALL.